US009634530B2

(12) United States Patent
Klein et al.

(10) Patent No.: US 9,634,530 B2
(45) Date of Patent: Apr. 25, 2017

(54) INTERIOR PERMANENT MAGNET MOTOR WITH SHIFTED ROTOR LAMINATIONS

(71) Applicants: Steven D. Klein, Munger, MI (US); Jeffrey T. Klass, Kawkawlin, MI (US); Mohammed R. Islam, Saginaw, MI (US); Mohammad S. Islam, Saginaw, MI (US); Mazharul H. Chowdhury, Midland, MI (US)

(72) Inventors: Steven D. Klein, Munger, MI (US); Jeffrey T. Klass, Kawkawlin, MI (US); Mohammed R. Islam, Saginaw, MI (US); Mohammad S. Islam, Saginaw, MI (US); Mazharul H. Chowdhury, Midland, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 502 days.

(21) Appl. No.: 13/839,225

(22) Filed: Mar. 15, 2013

(65) Prior Publication Data

US 2014/0265707 A1 Sep. 18, 2014

(51) Int. Cl.
*H02K 1/27* (2006.01)
*H02K 15/03* (2006.01)
(Continued)

(52) U.S. Cl.
CPC .............. *H02K 1/276* (2013.01); *H02K 1/28* (2013.01); *H02K 15/03* (2013.01); *H02K 29/03* (2013.01);
(Continued)

(58) Field of Classification Search
CPC ......... H02K 1/276; H02K 1/27; H02K 1/2766
(Continued)

(56) References Cited

U.S. PATENT DOCUMENTS 5,663,605 A * 9/1997 Evans et al. .................. 310/181
5,864,196 A * 1/1999 Yun ............................ 310/261.1
(Continued)

FOREIGN PATENT DOCUMENTS

CN 1627600 A 6/2005
CN 102916544 A 2/2013
(Continued)

OTHER PUBLICATIONS

Chinese Office Action for CN Application No. 201410151194.5 dated Dec. 31, 2015.
(Continued)

*Primary Examiner* — Thomas Truong
(74) *Attorney, Agent, or Firm* — Cantor Colburn LLP

(57) ABSTRACT

A rotor comprises a first rotor lamination and a second rotor lamination. The first rotor lamination and the second rotor lamination are configured for defining, when joined into rotor assembly, a central axis of rotation and a plurality of interior magnet pockets disposed symmetrically about the central axis of rotation, each pocket of the plurality of interior magnet pockets is configured for housing and retaining a permanent magnet. A method of forming a rotor comprises forming a first rotor lamination and a second rotor lamination, rotating the second rotor lamination about an axis of symmetry of the second rotor lamination; and mating the first rotor lamination to the second rotor lamination such that a first notch of the first rotor lamination is disposed adjacent to the first notch of the second rotor lamination.

9 Claims, 4 Drawing Sheets

(51) Int. Cl.
  *H02K 29/03* (2006.01)
  *H02K 1/28* (2006.01)
  *H02K 16/02* (2006.01)

(52) U.S. Cl.
  CPC ......... *H02K 16/02* (2013.01); *H02K 2201/06* (2013.01); *Y10T 29/49012* (2015.01)

(58) Field of Classification Search
  USPC .......................... 310/156.53, 156.56, 156.47
  See application file for complete search history.

(56) References Cited

U.S. PATENT DOCUMENTS

| | | | |
|---|---|---|---|
| 6,353,275 B1 * | 3/2002 | Nishiyama et al. | 310/156.53 |
| 6,717,314 B2 * | 4/2004 | Horst | D06F 37/304 310/156.01 |
| 2002/0112904 A1 * | 8/2002 | Matsunobu et al. | 180/65.2 |
| 2004/0041489 A1 | 3/2004 | Horst et al. | |
| 2005/0062354 A1 | 3/2005 | Iles-Klumpner | |
| 2005/0121990 A1 * | 6/2005 | Kaneko | H02K 29/03 310/156.47 |
| 2008/0224558 A1 * | 9/2008 | Ionel | H02K 1/2766 310/156.57 |
| 2014/0292132 A1 * | 10/2014 | Kazmin et al. | 310/156.01 |

FOREIGN PATENT DOCUMENTS

| | | | |
|---|---|---|---|
| EP | 0909003 A2 | 4/1999 | |
| GB | 564865 * | 10/1944 | ............. H02K 21/20 |
| JP | 2011120333 A | 6/2011 | |
| WO | 2013032353 A1 | 3/2013 | |
| WO | WO 2013/032353 A1 * | 3/2013 | ............... H02K 1/27 |

OTHER PUBLICATIONS

Machine translation of CN102916544.
Machine translation of JP2011120333.
European Search report for EP Application No. 14159381.4 dated Feb. 7, 2017.
Third Chinese Office Action for CN Application No. 201410151194.5 dated Dec. 30, 2016, English Translation.

* cited by examiner

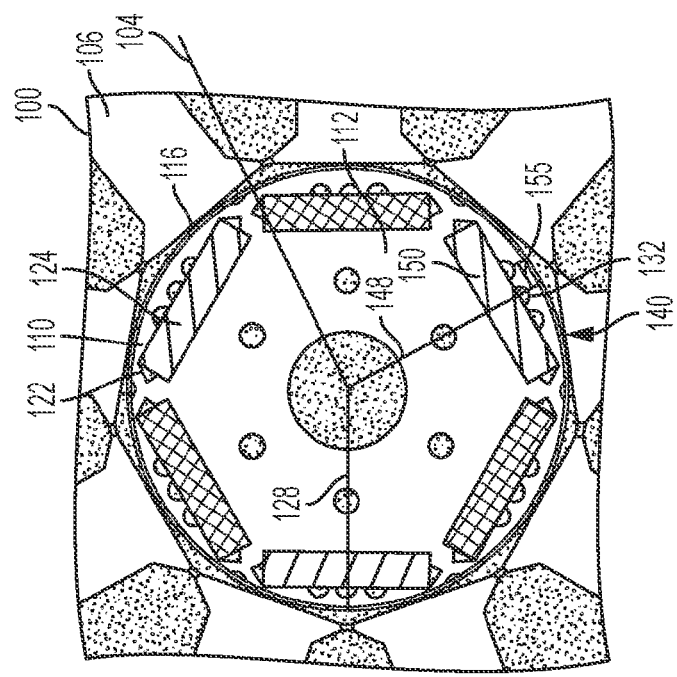
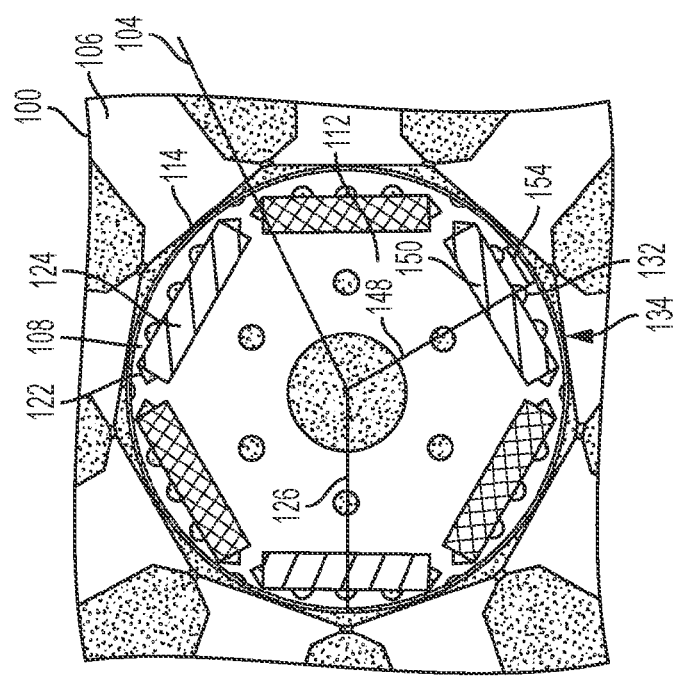

INTERIOR PERMANENT MAGNET MOTOR WITH SHIFTED ROTOR LAMINATIONS

BACKGROUND OF THE INVENTION

The present invention relates to interior permanent magnet motors and more particularly to an interior permanent magnet motor with a rotor comprising shifted laminations.

Permanent magnet brushless motors are widely used in industrial drives for high performance application because of their high torque density. One form of permanent magnet motors, interior permanent magnet (IPM) motors, are in relatively widely use due to the relative simplicity. For example, IPM motors commonly employ imbedded magnets that are relatively inexpensive, such as rectangular magnet blocks, embedded in their rotor cores. By embedding the magnets in the rotor core rather than affixing the magnets to an exterior surface of the rotor, magnet retention and manufacturing yield may both be improved without significantly impacting motor output characteristics relative to surface-mounted, permanent magnet (SPM) motors.

In high performance applications for IPM motors, cogging torque can become an important challenge, as well as torque ripple, vibration, and speed pulsations. Cogging torque, for example, may be caused by interactions between permanent magnets mounted on the rotor and slots that may be defined in an associated stator. To minimize cogging torque in an IPM motor can present significant challenges relative to SPM motors because IPM motors may include relatively smaller air gaps such that traditional techniques such as linear skewing or shaping of the magnets may be rendered impractical by the simplified rectangular shapes of the permanent magnets. As a result, attempts to minimize the cogging torque often entail added complexity and reduced power (i.e, torque) output for a given size of motor.

Current designs for interior permanent magnet motors (IMPs) seek to minimize cogging torque using a variety of techniques such as shaping of magnets and magnet poles, skewing of rotor and/or stator magnets, step-skewing of magnets, combining slots and pole, and placement of dummy notches in the stator teeth. Unfortunately, though, various harmonics can remain problematic. For example, in one recently encountered configuration, an 18th order harmonic emerged prominently and was attributed to a gap between adjacent segments of a stator in an IMP.

Accordingly, it is desirable to have improved systems and methods for reducing cogging torque in IPM motors. It is also desirable to have an improved IPM brushless motor providing reduced cogging torque characteristics across a full range of harmonic frequencies.

SUMMARY OF THE INVENTION

In one exemplary embodiment of the invention, a rotor comprises a first rotor lamination and a second rotor lamination. The first rotor lamination comprises a nonmagnetic substrate and defines a first outer periphery. Similarly, the second rotor lamination comprises a nonmagnetic substrate and defines a second outer periphery. The first rotor lamination and the second rotor lamination are configured for defining, when joined into rotor assembly, a central axis of rotation and a plurality of interior magnet pockets disposed symmetrically about the central axis of rotation, each pocket of the plurality of interior magnet pockets is configured for housing and retaining a permanent magnet.

In a further aspect, a method of forming a rotor comprises forming a first rotor lamination and a second rotor lamination, rotating the second rotor lamination about an axis of symmetry of the second rotor lamination; and mating the first rotor lamination to the second rotor lamination such that a first notch of the first rotor lamination is disposed adjacent to the first notch of the second rotor lamination.

In accordance with this embodiment, the first rotor lamination and the second rotor lamination each define, when joined into rotor assembly, a central axis of rotation and a plurality of interior magnet pockets disposed symmetrically about the central axis of rotation. Each pocket of the plurality of interior magnet pockets is configured for housing and retaining a permanent magnet The first notch is disposed adjacent to a center of each magnet pocket and a second notch is also disposed adjacent to the magnet pocket and offset from the center of the magnet pocket. The first rotor lamination and the second rotor lamination each have an axis of symmetry passing through a center of the respective rotor lamination and an edge of the rotor lamination.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 5 shows an exemplary first rotor lamination having a first symmetric notch pattern;

FIG. 6 shows an exemplary second rotor lamination having a second symmetric notch pattern that differs from the notch pattern of the first rotor lamination shown in FIG. 5.

DETAILED DESCRIPTION

Figure 3:
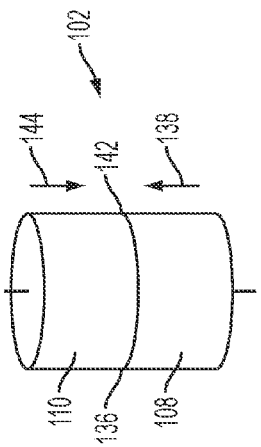
FIG. 3 shows an exemplary rotor comprising a first rotor lamination and a second rotor lamination.

Referring now to the Figures, where the invention will be described with reference to specific embodiments, without limiting same, in an exemplary embodiment, a machine, such as a brushless interior permanent magnet motor 100, may include a rotor 102 disposed for rotation about a central axis of rotation 104 within a stator assembly 106. As shown in FIG. 3, such a rotor 102 may include a first rotor lamination 108 and a second rotor lamination 110. The first rotor lamination 108 comprises a substrate 112 and defines a first outer periphery 114, which may be substantially cylindrical. In an exemplary embodiment, the second rotor lamination 110 also comprises a substrate 112 and defines a second outer periphery 116, which may also be substantially cylindrical.

The first rotor lamination 108 and the second rotor lamination 110 are configured for defining, when joined into a rotor assembly 102, a central axis of rotation 104 and a plurality of interior magnet pockets 122 disposed about the central axis of rotation 104. As shown in FIGS. 1-2 and 5-6, the pockets may be disposed symmetrically about the central axis of rotation 104, meaning that if the first rotor lamination 108 were divided into an even number of pie-shaped segments (e.g., six or eight or ten or twelve segments) such that each segment were to contain one interior magnet pocket, then each of the segments would look identical to each of the other segments. Each interior magnet pocket of the plurality of interior magnet pockets 122 is configured for housing and retaining a permanent magnet 124 in a fixed position relative to the rotor assembly 102. It should be appreciated that each of the magnet pockets may be formed entirely within the first rotor lamination 108, entirely within the second rotor lamination 110, or partially within the first rotor lamination 108 and partially within the second rotor lamination 110.

As mentioned above, in an exemplary embodiment, a rotor 102 of an IPM comprises a first rotor lamination 108 that is mated with a second rotor lamination 110. The mating of the first rotor lamination 108 with the second rotor lamination 110 may be accomplished in a number of manners including by installing fasteners, such as rivets or screws, between the rotor laminations or by applying an adhesive between the rotor laminations, by welding the laminations or other means known in the art.

In an exemplary embodiment, a rotor 102 includes a plurality of interior permanent magnets, each interior permanent magnet 124 being disposed in a respective interior magnet pocket of the plurality of interior magnet pockets 122. Each interior magnet pocket of the plurality of interior magnet pockets 122 may have a substantially rectangular cross-section, when such a cross-section is taken perpendicular to the central axis of rotation 104.

Figure 2:
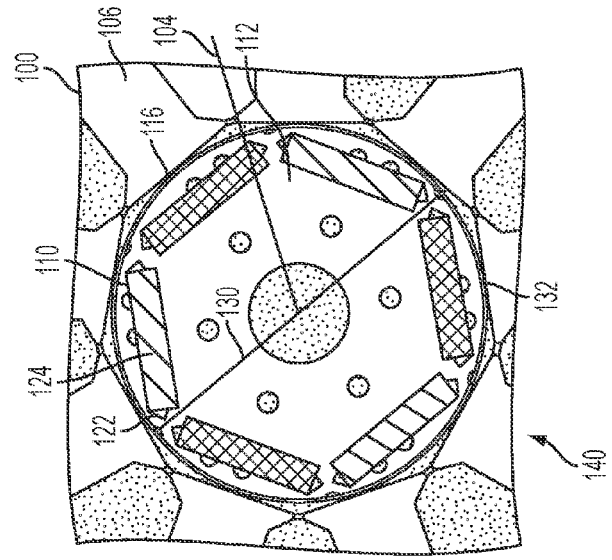
FIG. 2 shows an exemplary second rotor lamination that is substantially a mirror image (i.e., a flipped version) of the rotor lamination of FIG. 1.
Figure 1:
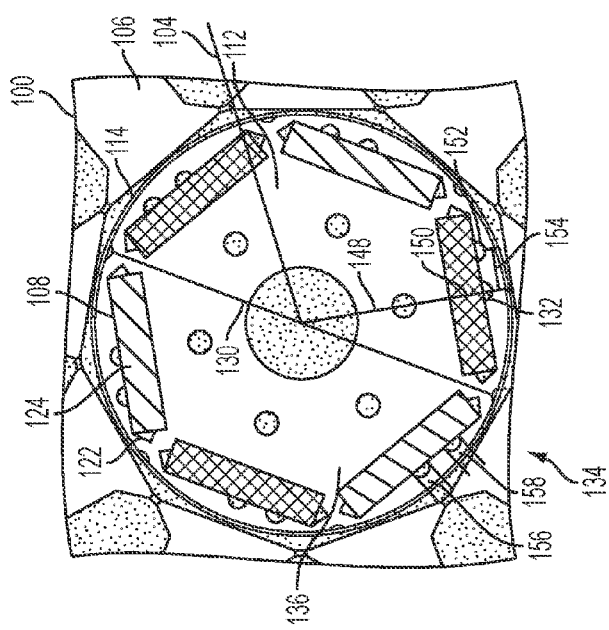
FIG. 1 shows an exemplary first rotor lamination.

In an exemplary embodiment, each rotor lamination may be symmetric. For example, as mentioned above, a plurality of pie-shaped segments of the rotor lamination may each be substantially similar to one another. As shown in FIGS. 1-2, the symmetry may be evident when the pie-shaped segments are selected so as to each contain an entire interior magnet pocket 122. As shown in FIGS. 5-6, the symmetry may also be evident when the pie-shaped segments are selected so as to bisect each interior magnet pocket.

As shown in FIGS. 5 and 6, in one exemplary embodiment, the first rotor lamination 108 may define a first cross-section taken perpendicular to the central axis of rotation 104, wherein the first cross-section is symmetrical about a line 126 that intersects the central axis of rotation 104. Similarly, the second rotor lamination 110 may similarly define a second cross-section taken perpendicular to the central axis of rotation 104, wherein the second cross-section is symmetrical about a line 128 that intersects the central axis of rotation 104.

It may be convenient that the second cross-section be a mirror image of the first cross-section. In such an embodiment, as shown in FIGS. 1-2, for example, both the first rotor lamination 108 and the second rotor lamination 110 may be stamped or punched or cast or machined in an identical, or nearly identical, manner. Accordingly, the first rotor lamination 108 and the second rotor lamination 110 may be produced using one or more common manufacturing processes. Then, prior to assembly into a rotor 102, one of the rotor laminations would be rotated about an axis 130 that passes through the central axis of rotation 104 so as to become a second rotor lamination 110 prior to assembly with a first rotor lamination 108.

The above-described common manufacturing process may be useful, for example, in connection with an embodiment wherein the first rotor lamination 108 defines at least one notch 132 disposed so as to form a first notch pattern 134 when an inside face 136 of the first rotor lamination 108 is facing in a first direction 138, while the second rotor lamination 110 defines at least one notch disposed so as to form a second notch pattern 140 when an inside face 142 of the second rotor lamination 110 is facing in a direction 144 opposing the first direction 138, with the second notch pattern 140 being a mirror image of the first notch pattern 134. In particular, the first notch pattern 134 may comprise not only a center notch 132 disposed along a first radial line 148 that intersects a center 150 of each magnet pocket, but also an offset notch 152 that is disposed a first offset distance 154 from the first radial line 148.

When the first and second rotor laminations are produced so as to both include the identical notch pattern, as shown in FIGS. 1-2, one of the rotor laminations (e.g., the second rotor lamination 110) may be flipped prior to being mated with the other rotor lamination (e.g., the first rotor lamination 108) such that a leading notch may be provided by one rotor lamination while a following notch is provided by the other rotor lamination. This manufacturing and assembly technique may be beneficial not only for simplifying the manufacturing equipment and reducing the number of unique parts used in producing a rotor 102, but also for improving quality and producing cancellation of certain harmonics in a mated assembly of rotor laminations.

In accordance with the above-described embodiments, a diameter 156 of the center notch 132 may be approximately equal to a diameter 158 of the offset notch 152. Alternatively, a diameter 156 of the center notch 132 may differ appreciably from a diameter 158 of the offset notch 152.

In an exemplary embodiment, as shown in FIGS. 1-2, the first rotor lamination 108 may define at least one notch disposed so as to form a first notch pattern 134 when an inside face 136 of the first rotor lamination 108 is facing in a first direction 138 while the second rotor lamination 110 defines at least one notch disposed so as to form a second notch pattern 140 when an inside face 136 of the first rotor lamination 108 is facing in a direction 144 opposing the first direction 138 (i.e., the second rotor lamination 110 has been flipped over, i.e., rotated about a line 126 that intersects the central axis of rotation 104), with the second notch pattern 140 differing appreciably from the first notch pattern 134.

In an exemplary embodiment, as shown in FIGS. 5-6, a first notch pattern 134 may comprises a center notch 132 disposed along a first radial line 148 that intersects a center 150 of each magnet pocket. In addition, the first notch pattern 134 may comprise two offset notches that are each disposed a first offset distance 154 from the first radial line 148 on opposing sides of the first radial line 148. The second notch pattern 140 may also comprise a center notch 132 disposed along a first radial line 148 intersecting a center 150 of the magnet pocket and two offset notches that are each disposed a second offset distance 155 from the first radial line 148 on opposing sides of the first radial line 148 with the second offset distance 155 differing appreciably from the first offset distance 154. The combination of a first rotor lamination 108 having one notch pattern (e.g., widely spread, symmetrically disposed offset notches) with a second rotor lamination 110 having a different notch pattern (e.g., narrowly spread, symmetrically disposed offset notches) may produce a desirable cogging torque characteristic via the cancellation of otherwise undesirable contributions from each of the laminations.

It should be appreciated that a diameter 156 of the center notch 132 may be approximately equal to a diameter 156 of each offset notch 152 or, alternatively, may differ appreciably from a diameter 156 of each offset notch 152.

A method of forming a rotor 102, therefore, may comprise forming a first rotor lamination 108 and a second rotor lamination 110, rotating the second rotor lamination 110 about the axis of symmetry; and mating the first rotor lamination 108 to the second rotor lamination 110. Once mated, the laminations may be suitably fastened. In accordance with the method, the first rotor lamination 108 and the second rotor lamination 110 define, when joined into rotor assembly 102, a central axis of rotation 104 and a plurality of interior magnet pockets 122 disposed symmetrically about the central axis of rotation 104. Each pocket of the plurality of interior magnet pockets 122 is configured for housing and retaining a permanent magnet 124, and such retaining may be configured such that the magnets are retained in a fixed relationship relative to the rotor assembly 102. A first notch is disposed adjacent to a center 150 of each magnet pocket, and a second notch is also disposed adjacent to the magnet pocket and offset from the center 150 of the magnet pocket. The first rotor lamination 108 and the second rotor lamination 110 each have an axis of symmetry passing through a center 150 of the respective rotor lamination and an edge of the rotor lamination. As shown in FIGS. 1-2, however, the first rotor lamination 108 may be a mirror image of the second rotor lamination 110.

The step of mating the first rotor lamination 108 to the second rotor lamination 110 is performed such that the first notch of the first rotor lamination 108 is disposed adjacent to the first notch of the second rotor lamination 110. Each notch of the first rotor lamination 108 and each notch of the second rotor lamination 110 may be formed by punching. In connection with the above-described mirror-imaged laminations, a first punching apparatus may be suitably used for punching each notch of the first rotor lamination 108, with the same first punching apparatus also being suitably used for punching each notch of the second rotor lamination 110. Thus, the invention provides a simplified and cost-effective means for manufacturing a rotor 102 comprising a first rotor lamination 108 and a second rotor lamination 110.

In an exemplary embodiment, a method of forming a rotor 102 comprises forming a first rotor lamination 108 and a second rotor lamination 110 and mating the first rotor lamination 108 to the second rotor lamination 110 such that a magnet pocket of the first rotor lamination 108 is disposed adjacent to a magnet pocket of the second rotor lamination 110. In accordance with this exemplary embodiment, the first rotor lamination 108 defines at least one notch disposed so as to form a first notch pattern 134 when an inside face 136 of the first rotor lamination 108 is facing in a first direction 138, while the second rotor lamination 110 defines at least one notch disposed so as to form a second notch pattern 140 when an inside face 136 of the second rotor lamination 110 is facing in a direction 144 opposing the first direction 138, and while the second notch pattern 140 differs from the first notch pattern 134.

It should be appreciated that the first notch pattern 134 may comprise a center notch 132 disposed along a first radial line 148 intersecting a center 150 of the magnet pocket and two offset notches that are each disposed a first offset distance 154 from the first radial line 148 on opposing sides of the first radial line 148. In addition, the second notch pattern 140 may comprise a center notch 132 disposed along a first radial line 148 intersecting a center 150 of the magnet pocket and two offset notches that are each disposed a second offset distance from the first radial line 148 on opposing sides of the first radial line 148. Finally, as shown in FIGS. 5-6, the second offset distance differs appreciably from the first offset distance 154. A diameter 156 of the center notch 132 is approximately equal to a diameter 156 of each of the two offset notches. Alternatively, a diameter 156 of the center notch 132 may differ appreciably from a diameter 156 of each of the two offset notches.

Figure 4:
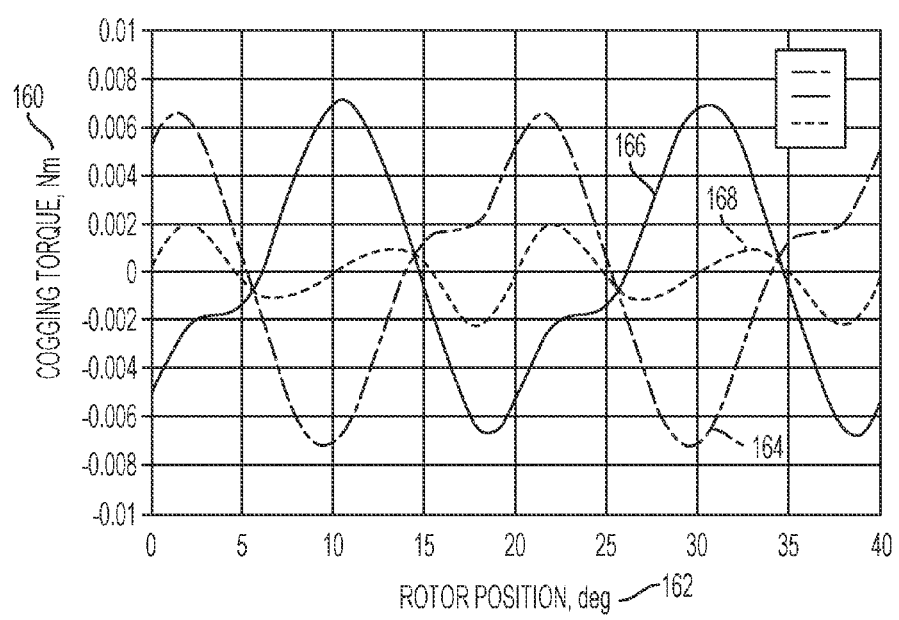
FIG. 4 shows an exemplary relationship between cogging torque and rotor position with individual contributions shown from each of two rotor laminations and with a resulting minimized cogging torque produced when the contributions from the first rotor lamination mitigate contributions from the second rotor lamination.

FIG. 4 shows an exemplary relationship between cogging torque 160 and rotor position 162 with individual contributions shown from each of two rotor laminations 164, 166 and with a resulting minimized cogging torque 168 produced when the contributions from the first rotor lamination 164 mitigate contributions from the second rotor lamination 166. By providing two differing rotor laminations, each having a unique notch pattern, and combining the two differing rotor laminations to form a single rotor 102, cogging torque may be reduced as shown in FIG. 4. As discussed above the differing rotor laminations may be provided, as shown in FIGS. 1-2, by manufacturing a single asymmetric pattern on the laminations, and then flipping one of the laminations before combining them to form the rotor 102. Alternatively, as shown in FIGS. 5-6, two symmetric, yet differing, laminations may be combined so as to form the rotor 102 with advantageous reductions in cogging torque.

Figure 7:
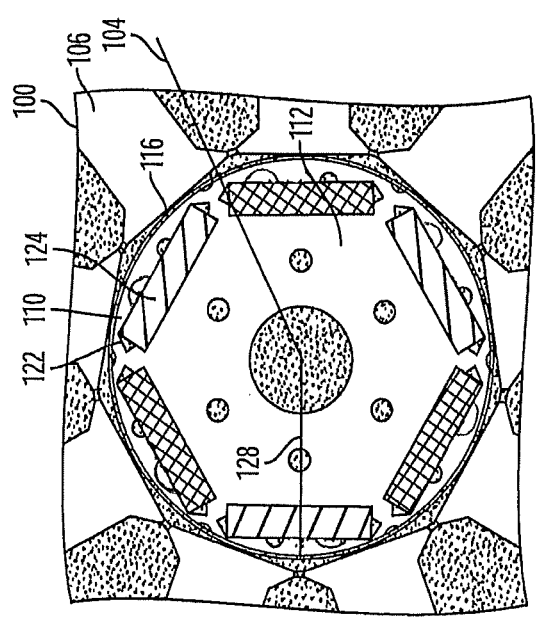
FIG. 7 shown an exemplary rotor lamination having an asymmetric notch pattern in which notches are asymmetrically distributed along an outer edge of each of the magnets.

As shown in FIG. 7, a notch pattern may be employed wherein the notches are asymmetrically distributed along an outer edge of each of the magnets 122. More specifically, a first notch, having a smaller diameter, may be positioned at an off-center location along an outer edge of each of the magnets 122 while a second notch, having a larger diameter is positioned at a different off-center location along an outer edge of each of the magnets 122. In one embodiment, the larger of the two notches is in leading position along each magnet, and in another embodiment, the larger of the two notches is in a trailing location along each magnet. It should also be appreciated that a notch having an intermediate-sized diameter may be disposed along the edge of each magnet in a position between the larger-diameter notch and the smaller-diameter notch.

It should be appreciated that two or more rotor laminations may be superimposed upon one another so as to create a rotor 102 that produces desirable characteristics in terms of cogging torque and other parameters. In some embodiments, identical laminations may be combined in a front-to-back orientation with all of the notch patterns aligned. In other embodiments, identical laminations may be combined with one of the laminations flipped, producing a front-to-front orientation or a back-to-back orientation, so that the notch patterns may be reversed (i.e., mirror images of one another). In further embodiments, differing laminations may be used. Accordingly, notch patterns may be produced with variation or with uniformity along the axis of rotation 104 of the rotor 102, and rotors of desirable lengths along the axis of rotation 104 can be economically and reliably produced.

In addition to employing a rotor having a desirable, optimized pattern of notches, which may be constant or which may be varying along an axial direction, further improvements in cogging torque may also be realized by skewing a gap between segments of a stator assembly used in connection with the rotor. For example, in a segmented stator assembly 106, a gap may be present between stator segments with the gap typically being oriented along a radial direction. It has been found, however, that by skewing the gap, such that the gap is disposed at an angle relative to a radial direction, cogging torque may advantageously be reduced.

For example, in one embodiment, a gap between adjacent segments of a segmented stator assembly 106 is disposed at an angle of approximately 45 degrees from the radial direction. This intermediate angle (falling half-way between what would be a tangent on the one hand and an unskewed radius on the other hand) is disclosed as a representative example. It should be appreciated, however, that other skew angles may be advantageous in particular applications as well. For example, it may be desirable to configure the stator segments such that a gap between segments is disposed at an angle relative to the radial direction, with the angle being approximately 10 degrees or 20 degrees or 30 degrees or 45 degrees or 60 degrees, with each selection having its own effect on cogging torque. It is up to the designer, then, to choose a particular combination of segment gap skewing and rotor notch pattern to produce a suitable cogging torque characteristic.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A rotor comprising:
    a first rotor lamination comprising a first substrate and defining a first outer periphery and a first plurality of interior magnet pockets;
    a second rotor lamination comprising a second substrate and defining a second outer periphery and a second plurality of interior magnet pockets;
    a joining of the first rotor lamination and the second rotor lamination into a rotor assembly defines a central axis of rotation and the first and second plurality of interior magnet pockets are disposed symmetrically about the central axis of rotation and each pocket of the first and second plurality of interior magnet pockets are proximately aligned such that each pocket houses and retains a permanent magnet that extends through the first rotor lamination and the second rotor lamination;
    the first rotor lamination includes a first notch pattern having a first center notch disposed along a first radial line intersecting a center of each magnet pocket and a leading notch, the first center notch and leading notch each extending from the first plurality of interior magnet pockets;
    the second rotor lamination includes a second notch pattern having a second center notch disposed along a second radial line intersecting the center of each magnet pocket and a following notch offset from the leading notch, the second center notch and the following notch each extending from the second plurality of interior magnet pockets; and
    the first center notch of the first notch pattern is proximately aligned with the second center notch of the second notch pattern.

2. The rotor of claim 1, wherein each pocket of the plurality of interior magnet pockets has a rectangular cross-section taken perpendicular to the central axis of rotation.

3. The rotor of claim 1, wherein the second notch pattern is a mirror image of the first notch pattern.

4. The rotor of claim 3:
    wherein the leading notch is disposed a first offset distance from the first radial line.

5. The rotor of claim 1:
    wherein the first notch pattern has a first offset notch, the leading notch and the first offset notch are each disposed a first offset distance from the first radial line on opposing sides of the first radial line;
    wherein the second notch pattern has a second offset notch, the following notch and the second offset notch are each disposed a second offset distance from the first radial line on opposing sides of the first radial line; and
    wherein the second offset distance differs from the first offset distance.

6. The rotor of claim 5, wherein a diameter of at least one of the first center notch and the second center notch differs from a diameter of each offset notch.

7. A method of forming a rotor comprising:
    forming a first rotor lamination and a second rotor lamination, the first rotor lamination defines a first notch pattern that extends from a magnet pocket of the first rotor lamination and includes a first center notch disposed along a first radial line intersecting a center of the magnet pocket and two offset notches that are each disposed a first offset distance from the first radial line on opposing sides of the first radial line, the second rotor lamination defines a second notch pattern that extends from a magnet pocket of the second rotor lamination and includes a second center notch disposed along the first radial line intersecting the center of the magnet pocket and two offset notches that are each disposed a second offset distance from the first radial line on opposing sides of the first radial line, and the second notch pattern differs from the first notch pattern; and
    mating the first rotor lamination to the second rotor lamination such that the magnet pocket of the first rotor lamination is disposed adjacent to and is approximately aligned with the magnet pocket of the second rotor lamination.

8. A method of forming a rotor as claimed in claim 7:
    wherein the second offset distance differs from the first offset distance.

9. A method of forming a rotor as claimed in claim 8, wherein a diameter of the center notch is approximately equal to a diameter of each of the two offset notches.

* * * * *